United States Patent [19]

Briod

[11] Patent Number: 5,711,906
[45] Date of Patent: Jan. 27, 1998

[54] METHOD OF MANUFACTURING A BLACK ZIRCONIA-BASED ARTICLE AND BLACK ZIRCONIA-BASED DECORATIVE ARTICLE NOTABLY OBTAINED BY THIS METHOD

[75] Inventor: Renaud Briod, Yverdon, Switzerland

[73] Assignee: Asulab S.A., Bienne, Switzerland

[21] Appl. No.: 423,212

[22] Filed: Apr. 17, 1995

[30] Foreign Application Priority Data

Apr. 19, 1994 [CH] Switzerland ............ 01 182/94

[51] Int. Cl.$^6$ .................................................. C04B 35/64
[52] U.S. Cl. ............................ 264/63; 264/64; 264/65; 264/67
[58] Field of Search ............................ 264/65, 63, 64, 264/67; 501/86, 103, 104

[56] References Cited

U.S. PATENT DOCUMENTS

| | | | |
|---|---|---|---|
| 4,656,145 | 4/1987 | Soroi | 501/86 |
| 4,977,114 | 12/1990 | Horinouchi | 501/104 |
| 5,059,562 | 10/1991 | Gentsu | 501/87 |
| 5,118,457 | 6/1992 | Gentsu | 264/65 |

FOREIGN PATENT DOCUMENTS 654770  3/1986  Switzerland .

*Primary Examiner*—Timothy Speer
*Attorney, Agent, or Firm*—Pollock, Vande Sande & Priddy

[57] ABSTRACT

The invention concerns a method of manufacturing a black zirconia-based article, characterized in that it includes successive steps consisting of: producing a first mixture comprising a zirconia powder, 3 to 70% by weight of a stabilizer selected from the group of oxides comprising yttrium oxide, magnesium oxide, cerium oxide and calcium oxide, 1% to 10% by weight of a pigment selected from the group formed on the one hand by a cobalt oxide and iron oxide powder and on the other hand, by a spinel $CoFe_2O_4$ powder; producing a second mixture comprising said first mixture and a binder; producing a granulated mixture by granulating said second mixture; forming a rough model by giving said second granulated mixture the shape of the desired article; sintering in air for at least 30 minutes at a temperature less than 1,400° C. when said pigment is a cobalt oxide and iron oxide powder and less than 1,600° C. when the pigment is a spinel $CoFe_2O_4$ powder; and polishing said sintering said rough model.

16 Claims, No Drawings

METHOD OF MANUFACTURING A BLACK ZIRCONIA-BASED ARTICLE AND BLACK ZIRCONIA-BASED DECORATIVE ARTICLE NOTABLY OBTAINED BY THIS METHOD

FIELD OF THE INVENTION

The invention concerns a method of manufacturing a black zirconia-based article and a black zirconia-based decorative article notably obtained by this method.

BACKGROUND OF THE INVENTION

Patent CH 654 770 already discloses a method of manufacturing a black zirconia-based article. According to this method, a moulded element formed by a matrix principally composed of zirconia containing at least one stabilizer selected from the group of oxides comprising yttrium oxide, magnesium oxide, cerium oxide and calcium oxide is sintered at a temperature of 1,400° to 1,600° C. in a non-oxidising atmosphere so that said sintered element becomes black. The sintered element is then polished.

This method however has the major disadvantage of having to be carried out in an installation comprising an oven functioning in a non-oxidizing atmosphere. Such installations are costly and thus increase the cost price of articles which are manufactured in the latter. Moreover, not all companies working in the ceramics field are necessarily equipped with such installations.

SUMMARY OF THE INVENTION

The principal aim of the invention is thus to provide, on the one hand, a method of manufacturing a black zirconia-based article able to be carried out in an installation which functions in air and on the other hand, a black zirconia-based article which, while having satisfactory mechanical properties, has a deep black colouring and an intense brilliance particularly suited to the production of decorative articles.

The invention thus concerns a method of manufacturing a black zirconia-based article, characterised in that it includes successive steps consisting of: producing a first mixture comprising a zirconia powder, 3 to 70% by weight of a stabilizer selected from the group of oxides comprising yttrium oxide, magnesium oxide, cerium oxide and calcium oxide, 1% to 10% by weight of a pigment selected from the group formed on the one hand by a cobalt oxide and iron oxide powder and on the other hand, by a spinel $CoFe_2O_4$ powder; producing a second mixture comprising said first mixture and a binder; producing a granulated mixture by granulating said second mixture; forming a rough model by giving said second granulated mixture the shape of the desired article; sintering in air for at least 30 minutes at a temperature less than 1,400° C. when said pigment is a cobalt oxide and iron oxide powder and less than 1,600° C. when the pigment is a spinel $CoFe_2O_4$ powder; and polishing said sintered said rough model.

This method has the principal advantage in comparison to the method of the prior art of using conventional ovens which function in air and are generally available in the industry. Furthermore, in the case of the use of a cobalt oxide and iron oxide based pigment, by sintering at a relatively low temperature (less than 1,400° C.)—which one can obtain with the aid of less expensive ovens than those required to obtain higher temperatures—the quantity of energy necessary to sinter the articles and consequently, the cost price of articles manufactured by this method, is reduced. On the other hand, the black colour obtained does not have any trace of green as it is often the case of black zirconia articles including chromium oxide and/or nickel oxide based pigments.

The invention also concerns a black zirconia-based decorative article obtained notably by the above-described method, characterized in that it is formed by a sintered object made from a moulded object essentially comprising a matrix of zirconia, 3% to 70% by weight of at least one stabilizer selected from the group of oxides comprising yttrium oxide, magnesium oxide, cerium oxide and calcium oxide, and a pigment formed by cobalt oxide and iron oxide powder, or by spinel $CoFe_2O_4$ powder, said pigment representing 1 to 10% by weight.

Other characteristics and advantages of the invention will appear in light of the following description of an embodiment example of the method.

DETAILED DESCRIPTION OF THE INVENTION

The manufacturing method of the invention which will now be described in detail is one which enables a black zirconia article to be made whose appearance and mechanical properties are particularly suited to the production of constituent parts of wrist watches or the production of any other decorative article.

The black zirconia article obtained by this method contains 99% to 90% by weight of stabilised zirconia and the complement by weight, that is to say 1 to 10%, of a mixture of cobalt oxide and iron oxide, the proportion of this complement being preferably comprised between 2 and 5%.

The zirconia is stabilized in a conventional manner in tetragonal phase by at least one stabilizer selected from the group of oxides comprising yttrium oxide, magnesium oxide, cerium oxide and calcium oxide, this stabilizer being 3 to 70% in quantity by weight in relation to the zirconia.

According to alternative embodiments of the invention, the mixture of cobalt oxide and iron oxide may be replaced by a spinel $CoFe_2O_4$ powder.

One weighs 950 g of zirconia powder stabilized with 5.3% by weight of yttrium oxide. The powder used has an average granulometric size of the magnitude of a micron, typically of 0.3 microns, and it is sold under the name TZ-3Y by the Tosoh Corporation, Japan.

One then weighs 18.2 g of a cobalt oxide powder, having an average granulometric size of the magnitude of a micron, sold by Riedel de Haen, Germany.

Finally, one weighs 31.8 g of a iron oxide powder, having an average granulometric size of the magnitude of a micron, sold by Riedel de Haen, Germany.

In this example, the cobalt oxide represents 36.4% by weight of the mixture of the metallic oxides forming the pigment, but it is of course clear that according to alternative embodiments of the process according to the invention, this proportion of cobalt oxide can vary from between 25 and 50% of the metallic oxide mixture and preferably between 32 and 38%.

It is to be noted that all these powders must preferably have a purity greater than 99.5%.

Once the weighing of the powders is completed, these powders are mixed and homogenized in a wet environment.

In the final phase of homogenization, approximately 50 g of a binder, for example a polyvinyl alcohol, is added.

One then proceeds to dry the mixture for example in a conventional atomizer.

The granulated product obtained is sieved to 315 microns.

The sieved granulated product is pressed into a mould having the configuration of the article which one wishes to obtain in order to form a rough model of the latter.

The article in its almost final form is placed in a sintering oven in air. The article is heated in a first phase, at a speed of 30° C. per hour, until approximately 1,000° C., then in a second phase at a speed of 50° C. per hour until 1,350° C. and is kept at a temperature of 1,350° C. for at least 30 minutes and preferably for one hour.

It will be noted that the sintering can of course be effected at any other temperatures higher or equal to 1,100° C. and less than 1,400° C.

Care should be taken when a cobalt oxide and iron oxide based pigment is used not to exceed a temperature close to 1,400° C. when the article is sintered since it would lead to some deterioration of the mechanical properties of the end product.

The article is then cooled, then worked to obtained a form suited to its final use.

Finally, the article is polished, for example, with the aid of a diamond paste. The article thus obtained has a brilliant black appearance so that it has attractive aesthetic features.

According to an alternative embodiment of the manufacturing method of the invention, the same steps as those described in the above example are used replacing the iron oxide and the cobalt oxide with an equivalent quantity of spinel $CoFe_2O_4$. In this case, the sintering temperature may be brought to 1,600° C. without this being indispensable for the production of the black zirconia-based decorative article according to the invention.

What is claimed is:

1. A method of making a black zirconia-based article, said method comprising successive steps of:

producing a first mixture comprising a zirconia powder, 3% to 70% by weight of a stabilizer selected from the group of oxides consisting of yttrium oxide, magnesium oxide, cerium oxide and calcium oxide, and 1% to 10% by weight of a pigment formed by a cobalt oxide and iron oxide powder or by a spinel $CoFe_2O_4$ powder;

producing a second mixture comprising said first mixture and a binder;

producing a granulated mixture by granulating said second mixture;

forming a moulded model by giving said granulated mixture the shape of the desired article by moulding;

sintering said moulded model in air for at least 30 minutes at a temperature less than 1,400° C. when said pigment is a cobalt oxide and iron oxide powder and less than 1,600° C. when said pigment is a spinel $CoFe_2O_4$ powder to provide a sintered model; and polishing said sintered model.

2. A method according to claim 1, wherein said first mixture comprises 2 to 5% by weight of said pigment.

3. A method according to claim 2, wherein the pigment is formed by a cobalt oxide and iron oxide powder and comprises between 25 and 50% of cobalt oxide.

4. A method according to claim 3, wherein the sintering temperature is between 1,300° and 1,400° C.

5. A method according to claim 3, wherein the stabilizer is yttrium oxide.

6. A method according to claim 2, wherein the pigment is formed by a spinel $CoFe_2O_4$ powder.

7. A method according to claim 6, wherein the sintering temperature is between 1,300° and 1,400° C.

8. A method according to claim 6, wherein the stabilizer is yttrium oxide.

9. A method according to claim 2, wherein the pigment is formed by a cobalt oxide and iron oxide powder and comprises 32 to 38% of cobalt oxide.

10. A method according to claim 9, wherein the sintering temperature is between 1,300° and 1,400° C.

11. A method according to claim 2, wherein the sintering temperature is between 1,300° and 1,400° C.

12. A method according to claim 2, wherein the stabilizer is yttrium oxide.

13. A method according to claim 1, wherein the stabilizer is yttrium oxide.

14. A method according to claim 13, wherein the sintering temperature is between 1,300° and 1,400° C.

15. A method according to claim 1 wherein the sintering temperature is between 1,000° C. and 1,400° C. when said pigment is a cobalt oxide and iron oxide powder, and between 1,000° C. and 1,600° C. when said pigment is a spinel $CoFe_2O_4$ powder.

16. A method according to claim 1, wherein the sintering temperature is between 1,300° and 1,400° C.

* * * * *